Nov. 22, 1966     M. W. WELLS     3,287,058
TRAILER VAN CONSTRUCTION
Filed Jan. 8, 1964
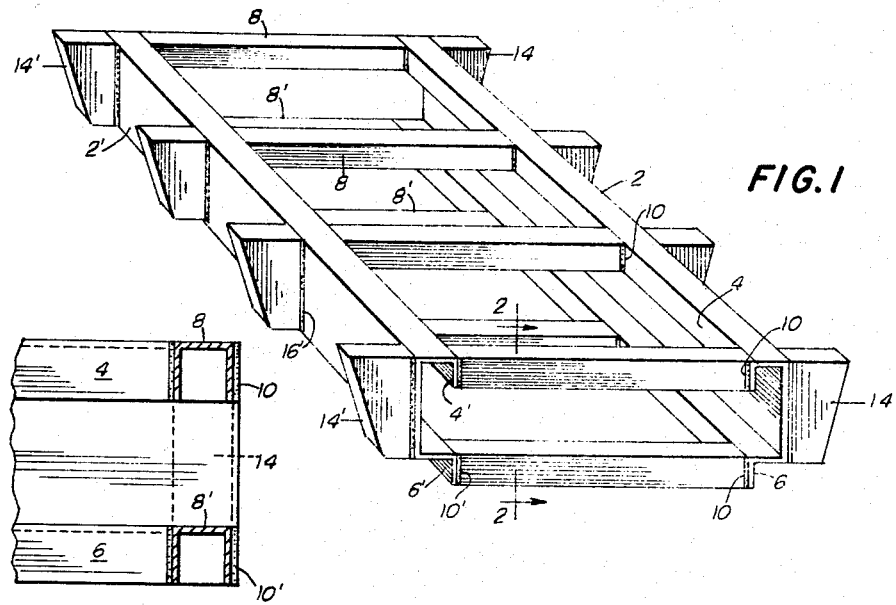
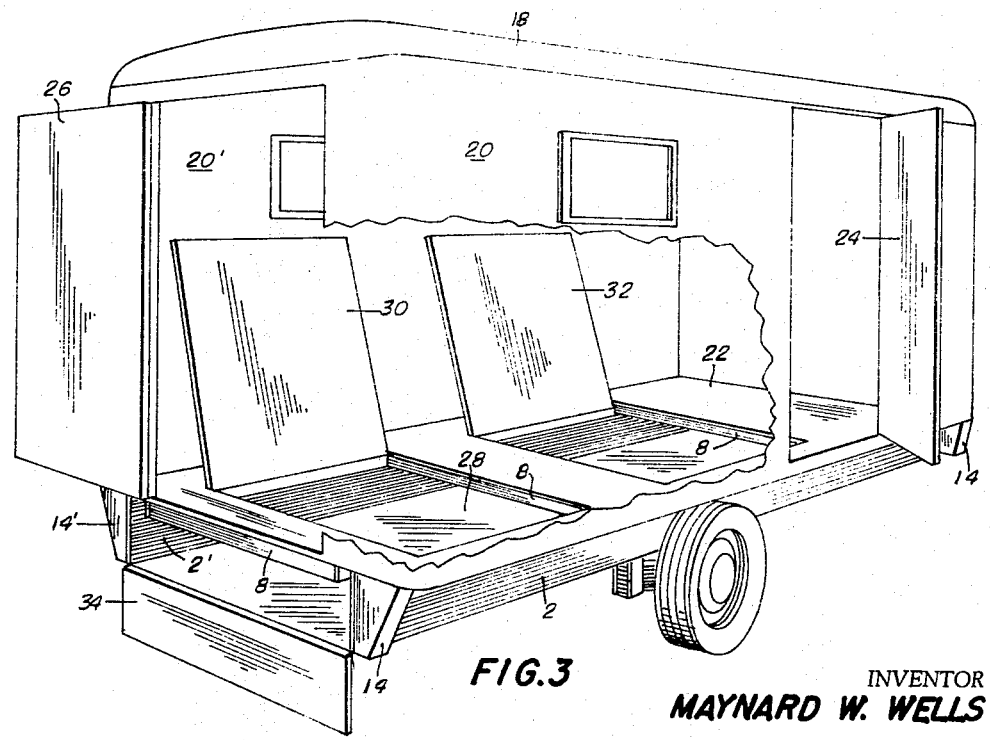
INVENTOR
MAYNARD W. WELLS
BY K. M. LEFEVER
ATTORNEY United States Patent Office 3,287,058
Patented Nov. 22, 1966

3,287,058
TRAILER VAN CONSTRUCTION
Maynard W. Wells, 3668 Gordon Road, Elkhart, Ind.
Filed Jan. 8, 1964, Ser. No. 336,571
4 Claims. (Cl. 296—37)

This invention relates to trailer vans and particularly to trailer van construction. More particularly the invention relates to a novel and unique feature of trailer van construction which converts hitherto waste space into a storage area of great utility. Still more particularly the invention relates to a welded steel trailer van frame with a unique storage area designed as an integral part thereof and having an access from both outside and inside the trailer van body.

The use of trailer vans is becoming more and more popular in industry since these vehicles serve to bridge the gap between self-propelled vans or trucks and the open vehicle which does not have any sizeable storage area and may not be conveniently left on the job, particularly a construction area. They also are being found to have utility in a number of hauling applications where the use of a full-size van is not justified and the smaller panel or pick-up vehicle is undesirable.

In such applications, and particularly in applications relating to the construction industry, it is essential that the maximum storage area be available. It would be particularly desirable to have a storage space to accommodate long objects such as ladders, pipes, extensions, braces, etc. It would also be desirable to have a storage space which would be available from both inside and outside the van.

It is therefore the object of this invention to provide a trailer van which has a storage area accessible from both the inside and the outside of the van body.

A further object of the invention is to provide a trailer van with a wide flat storage area which does not interfere with the storage area of the van proper.

Another object of the invention is to provide a horizontal storage area which is an area auxiliary to the van area and yet which may be enclosed and made as secure as the van proper.

A further object of the invention is to provide a frame for trailer vans which is of welded steel construction and is of a design such that a horizontal storage area may be constructed as an integral part of the frame without the sacrifice of any frame strength.

Other and further objects of the inventive concept will become apparent as the specification proceeds.

The invention may be more clearly explained by reference to the attached drawing in which FIG. 1 represents a top plan view, partly in perspective of a trailer van frame showing construction details;

FIG. 2 is a cross-sectional view taken along the line 2—2 of FIG. 1; and

FIG. 3 is a view, partly in section showing a trailer van which incorporates the auxiliary storage area and showing the means for access from both within and without the van proper.

Turning now to the drawing, reference numerals 2 and 2' designate a pair of main support members. These members are of "C" configuration in transverse section. As shown, the open area of the C is toward the center. Each main support member has an upper lip portion 4 and a lower lip portion 6 which extend downwardly.

The main support standards are preferably of steel and are "broken" or pressed to the desired configuration. It will be understood of course, that other metals or materials of construction may be used so long as the materials chosen result in members which have the desired structural strength characteristics.

The main support standards are disposed in horizontal spaced relation and are joined by at least three pairs of cross members. Each pair of cross members consists of an upper member 8 and a lower member 8' which are disposed in vertical relation one above the other.

In the usual type of trailer van frame construction these cross members are of one solid piece and the main support members are usually of tubular construction. Cross members 8 and 8' are of "C" construction in transverse section and are welded or otherwise integrally joined, to the lip portions of the main support members as shown at 10 and 10'. The open side of the cross members are positioned downwardly as clearly shown in FIG. 2 and the bottom member is flush with the lower section 12 and 12' and of the main support member, thus adding to the area of the auxiliary storage space.

Opposite the joints formed by each pair of cross members and the main support members there is attached winged cross member extensions depicted at 14 and 14'. These extensions may be any shape desired and are for the purpose of adding to the width of the frame member. They are normally attached by welding as shown at 16' but may be affixed by bolts, screws, or any other method of integrally joining.

FIG. 3 represents a completed trailer van which comprises a top or roof assembly 18 sides 20 and 20' and a floor assembly 22 which is constructed on the frame assembly and fastened thereon by fastening means, not shown. The trailer van is equipped with a side door 24 and an end door 26 to permit easy access. The auxiliary storage area made possible by the unique design of the inventive concept is shown at 28. Reference numerals 30 and 32 indicate access doors from the body of the van and 34 the rear access door from outside the van. Normally door 34 is equipped with locking means, not shown, as are doors 24 and 26.

To summarize briefly this invention relates to a novel trailer van frame and the van per se which contains a horizontal storage area which is available as a result of a unique frame design and which is accessible from both within and without the van proper. The unique frame assembly comprises a pair of main support members which are disposed in horizontal spaced relation and are of a "C" configuration in transverse section with a two lip portion extending downwardly. A pair of downwardly opening C channel cross members connect said main support members at spaced intervals one member of the pair being directly above the other. The space defined by the main support members and the cross members is thus utilized for a self-contained storage area as an integral part of the frame member.

What is claimed is:

1. In a trailer frame construction of the character described, a pair of parallel main support members in horizontal spaced relation and a plurality of pairs of horizontally spaced cross members disposed in perpendicular relation to said main support members, said main support members being of "C" configuration in cross section opening inwardly and having an upper and lower lip portions extending downwardly, a plurality of pairs of cross members disposed in spaced perpendicular relation to said main support members, each member of said pair vertically disposed in spaced relation, the upper member of each of said pair of cross members being integrally joined to the upper lip portions of each of said main support member and the lower member of each of said pair of cross members being integrally joined to the lower lip portions of each of said main support members.

2. In a trailer frame of welded steel construction a pair of parallel main support members in horizontal spaced relation and a plurality of pairs of horizontally spaced cross members disposed in perpendicular relation to said main support members, said main support members being of a "C" configuration in transverse section opening inwardly and having an upper and a lower lip portion extending downwardly, each of said pair of cross members comprising an upper and a lower member disposed in spaced vertical relation to each other, the upper member being integrally joined to the upper lip portions of each main support member and the lower member being integrally joined to the lower lip portions of each main support member, said upper and lower members being of C configuration in transverse section with the open side opening downwardly, wing-shaped cross member extensions integrally joined to the closed side of said main support members at points opposite the said cross member joints, the space defined by said main support members and said upper and lower cross members being adaptable for the construction of a longitudinal storage area the width of said cross members and the length of said main support standards.

3. A trailer van construction comprising a pair of support members of "C" configuration in transverse section, the open side of said members opening inwardly, a plurality of pairs of cross members perpendicularly connecting said main support members, each member of said pairs being disposed in vertical relation one with the other, the upper member of each pair being integrally joined to the upper portion of each main support member and the lower member of each pair being integrally joined to the lower portion of each main support member, a floor assembly mounted on said support members, sides extending upwardly from said floor assembly and a top covering said sides and means for gaining access to said van; said support members providing a longitudinal storage area beneath said floor extending the length of said van, said storage area having access means at the end and top thereof.

4. A trailer van construction including a welded steel frame comprising a pair of main support members disposed in horizontal spaced relation and a plurality of pairs of cross members in horizontal spaced relation perpendicular to said main support members, each of said pairs of cross members consisting of an upper and a lower member disposed in vertical relation to each other, the upper member of said pair being welded to the upper portion of each main support member and the lower member being welded to the lower portion of each main support member, a floor assembly mounted on said frame, sides extending upwardly from said floor assembly and a top covering said sides; said frame containing a longitudinal storage area therein, and means for gaining access to said storage area from the end thereof and through said floor assembly.

References Cited by the Examiner
UNITED STATES PATENTS

| | | | |
|---|---|---|---|
| 1,597,569 | 8/1926 | Barringer | 296—37 X |
| 2,189,719 | 2/1940 | Wallace | 280—106 |
| 2,194,356 | 3/1940 | Eklund | 280—106 |
| 3,034,824 | 5/1962 | Schubach. | |
| 3,103,379 | 9/1963 | Stone. | |

FOREIGN PATENTS

| | | |
|---|---|---|
| 52,535 | 12/1936 | Denmark. |
| 296,445 | 11/1928 | Great Britain. |
| 441,004 | 1/1936 | Great Britain. |
| 572,240 | 9/1945 | Great Britain. |

BENJAMIN HERSH, *Primary Examiner.*

MILTON BUCHLER, *Examiner.*

P. GOODMAN, *Assistant Examiner.*